May 29, 1951     J. E. BECK     2,555,108

PROGRESSIVE FEED STOKER

Filed April 30, 1947     6 Sheets-Sheet 1

INVENTOR.
June E. Beck
BY
*Carl H. Libbr*
Attorney

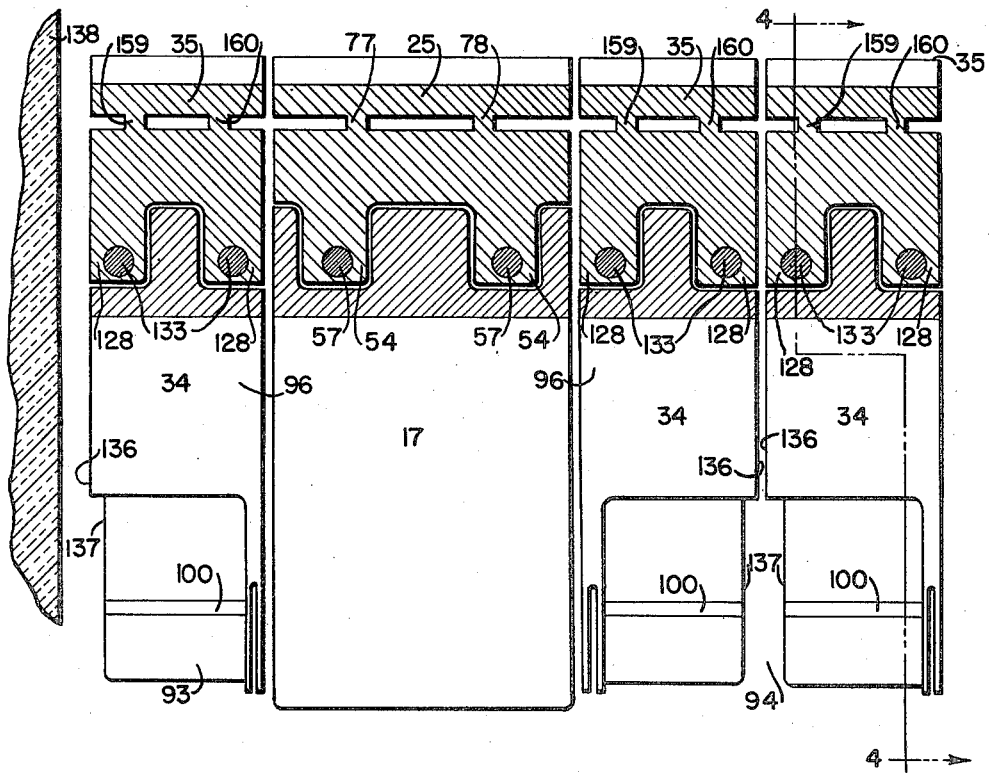
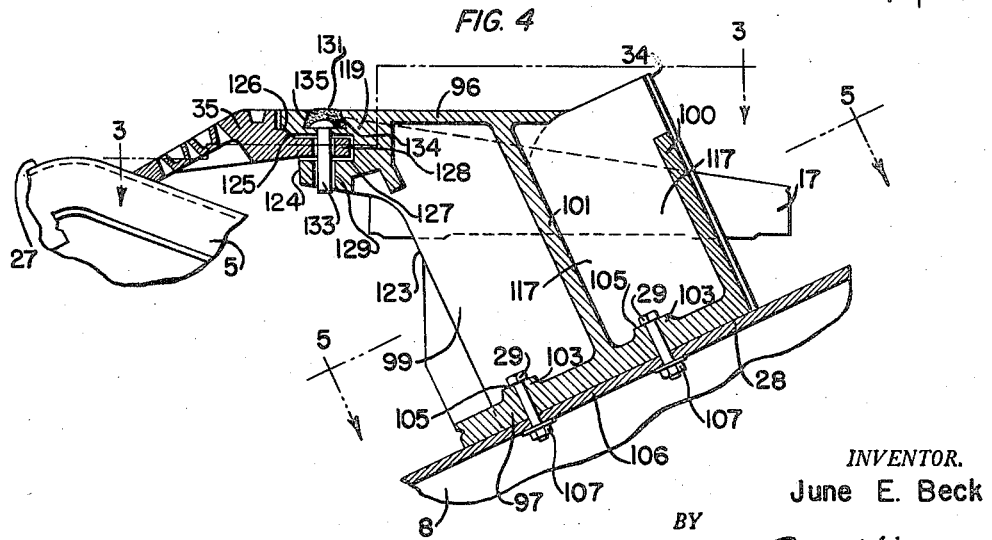

May 29, 1951  J. E. BECK  2,555,108
PROGRESSIVE FEED STOKER
Filed April 30, 1947  6 Sheets-Sheet 3

INVENTOR.
June E. Beck
BY
*Attorney*

May 29, 1951  J. E. BECK  2,555,108
PROGRESSIVE FEED STOKER
Filed April 30, 1947  6 Sheets-Sheet 4
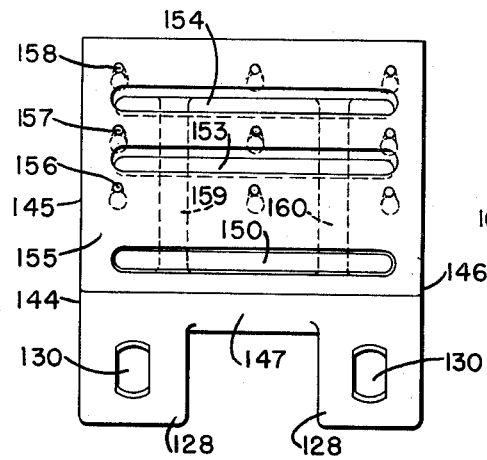
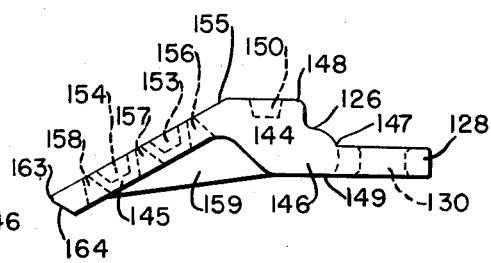
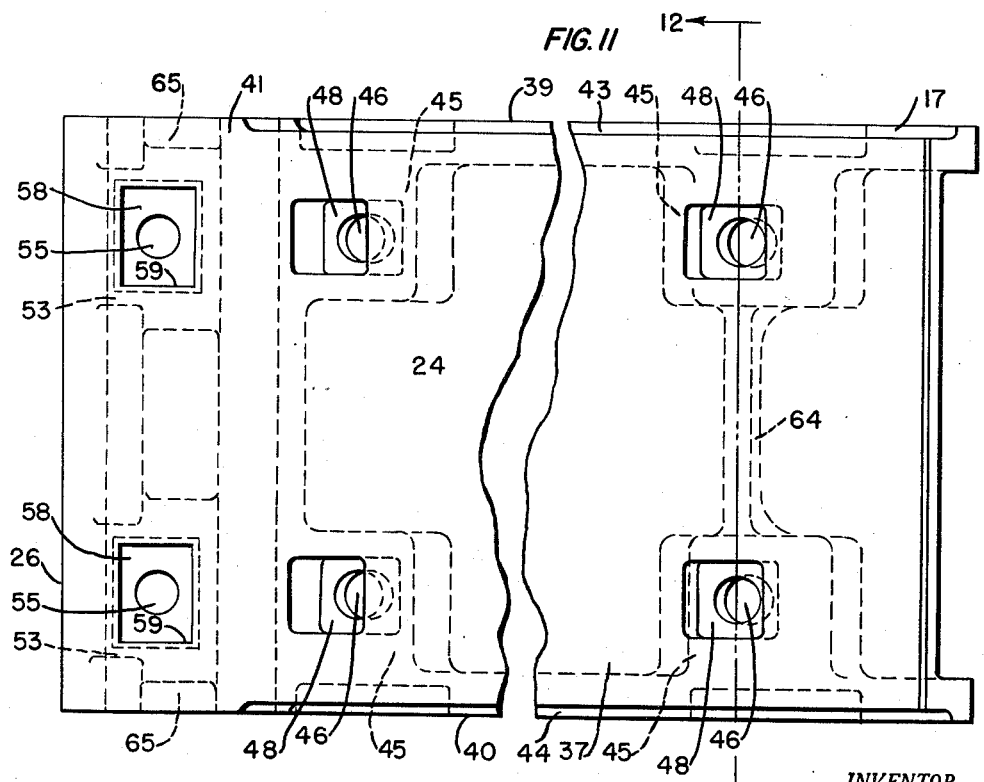
INVENTOR.
June E. Beck
BY
Attorney

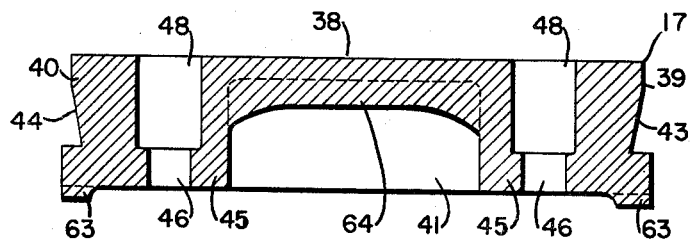
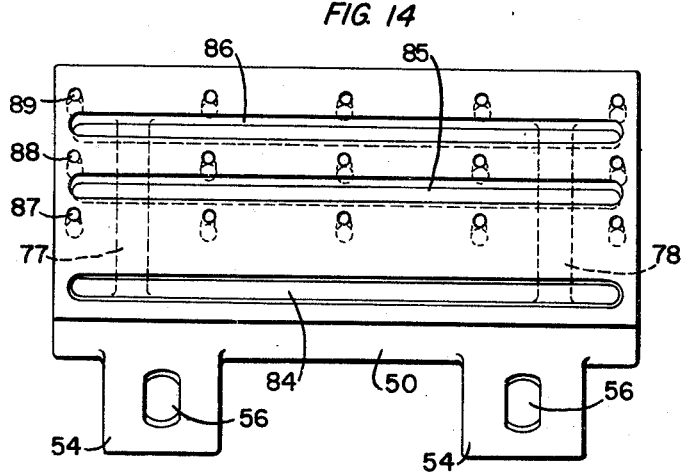
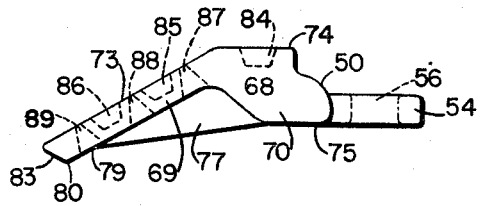
*INVENTOR.*
June E. Beck

May 29, 1951              J. E. BECK              2,555,108
PROGRESSIVE FEED STOKER
Filed April 30, 1947                            6 Sheets-Sheet 6
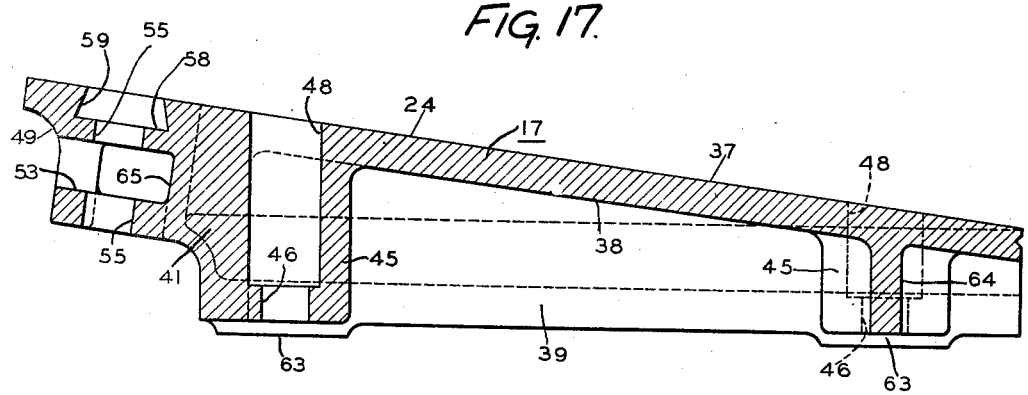
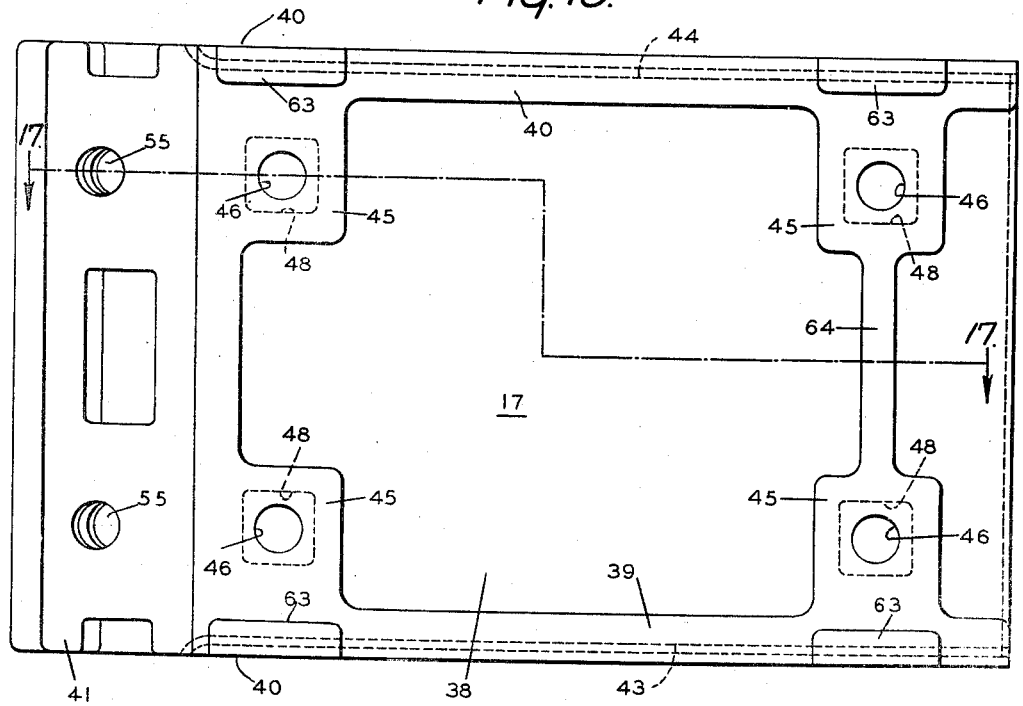
*INVENTOR.*
June E. Beck
BY
Howson & Howson
Attorneys Patented May 29, 1951

2,555,108

UNITED STATES PATENT OFFICE 2,555,108

PROGRESSIVE FEED STOKER

June E. Beck, Lyndhurst, N. J., assignor to American Engineering Company, Philadelphia, Pa., a corporation of Pennsylvania Application April 30, 1947, Serial No. 744,973

23 Claims. (Cl. 110—44)

This invention relates to furnace stokers, and more particularly to furnace stokers of the inclined grate, multiple retort type.

One object of the present invention is to provide in stokers of the stated character novel and highly improved coal plate extensions with removable nose pieces.

Another object is to provide novel and highly improved lower tuyère supports for stoker furnaces having removable nose pieces operatively attached thereto.

A further object is to provide novel nose pieces adapted for attachment to the lower tuyère supports and coal plate extensions of stoker furnaces in such a manner as to permit vertical movement thereof upon operation of the extension grates but which are effectively held against longitudinal movement.

A still further object is to provide securing means for the nose pieces attached to the lower tuyère supports and the coal plate extensions of stoker furnaces which are effectively shielded against the heat of the furnace, thereby insuring longevity of service of the parts under all conditions of operation.

A still further object is to provide lower tuyère supports, coal plate extensions and nose pieces associated therewith which are of simplified, strong and durable construction, economical in manufacture and easy to install.

Other and further objects will become apparent as the description of the invention progresses.

Of the drawings:

Fig. 3 is an enlarged view, partly in section, taken substantially along line 3—3 of Fig. 4, with parts removed to more clearly illustrate certain elements.

Fig. 4 is a sectional elevational view taken substantially along line 4—4 of Fig. 3.

Fig. 8 is a plan view of the nose piece shown in Fig. 7.

Fig. 9 is a side view of the nose piece shown in Figs. 7 and 8.

Fig. 11 is a plan view of the coal plate extension shown in Fig. 10.

Fig. 12 is a sectional view taken substantially along line 12—12 of Fig. 11.

Fig. 14 is a plan view of the nose piece shown in Fig. 13.

Fig. 15 is a side view of the nose piece shown in Figs. 13 and 14, and

Figs. 16 and 17 are, respectively, an inverted plan view of the coal plate extension shown in Fig. 10, and a sectional view on the line 17—17 of Fig. 16.

Figure 1:
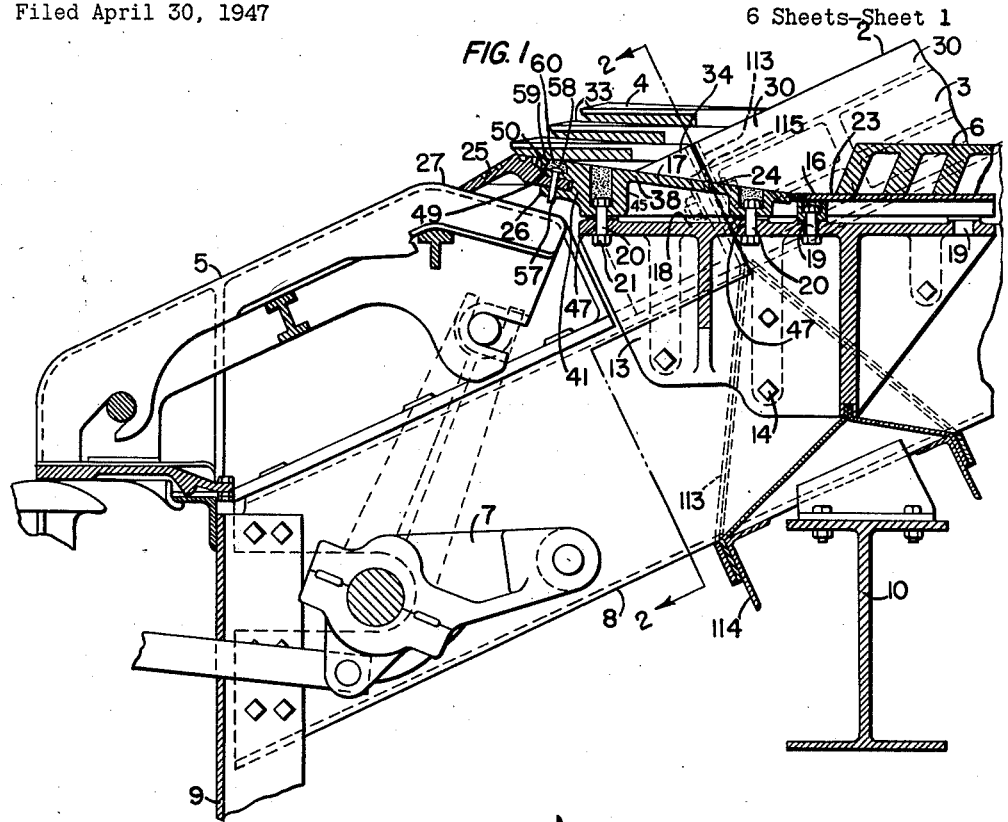
Fig. 1 is a longitudinal sectional view taken through a portion of one of the retorts of an underfeed stoker, showing a coal plate extension and associated nose piece and adjacent elements in assembled position.

Referring to the drawings, the numeral 1 designates generally a stoker of the multiple retort underfeed type, only a portion of the lower end of which is shown herein. The stoker 1 comprises an underfeed section 2, consisting of alternately disposed retorts 3 and tuyère rows 4, and an overfeed section or extension grate 5. The fuel is fed into the retorts 3 by feeding rams (not shown) and is then underfed along the retorts by pushers 6 mounted at the bottom of said retorts. The extension grates 5 are operated by a link and lever mechanism, indicated generally at 7, and function to overfeed the fuel to dump plates (not shown) from which the consumed fuel is directed to any suitable place of disposal. During operation of the extension grates 5 a combined rocking and reciprocating movement is imparted thereto by the operating mechanism 7.

The specific details of the stoker 1 generally and the extension grates 5 thereof form no part of the present invention, and except insofar as they pertain to the coal plate extensions 17 and the lower tuyère supports 34 and their nose pieces 25 and 35, respectively, a detailed description thereof will not be given.

When the terms "front" or "forward" and "rear" are used herein in the description of the elements of the stoker 1, the term "front" or "forward" shall mean the part or portion of the part extending toward the front of the stoker or in the direction of the pushers 6 thereof and the term "rear" shall mean the part or portion of the part extending toward the rear of the stoker or in the direction of the extension grates 5 thereof.

As shown more particularly in Figs. 1 to 5, a series of inclined channel beams 8 extend longitudinally of stoker 1 beneath the retorts 3 and tuyère rows 4 and are bolted or otherwise secured to supporting members 9 and 10. Substantially U-shaped supporting brackets 13 are secured by bolts 14 to the webs 15 of adjacent channel beams 8. A coal plate 16 and a coal plate extension 17 are secured to the upper wall 18 of each bracket 13 by bolts 19 and 20 respectively. The upper surfaces 23 and 24 respectively of coal plate 16 and coal plate extension 17 are in substantially longitudinal alignment and form a bearing support for the pusher 6.

A nose piece 25 is loosely secured to the rearwardly disposed end 26 of each coal plate extension 17 and, as shown more particularly in Fig. 1, rests upon the upper end 27 of extension grates 5. The fuel fed by pushers 6, accordingly, passes over coal plate 16, coal plate extension 17, nose piece 25 and onto extension grate 5 which in turn overfeeds it towards the rear of the stoker.

Secured to the upper flange 26 of each beam 8 by bolts 29 are a series of tuyère supports 30. The tuyère blocks 33 of each tuyère row 4 are supported upon the upper edges of the tuyère supports 30 in the usual manner. The lowermost tuyère supports 34 are laterally spaced from coal plate extensions 17 and the rearmost ends thereof are, as shown in Fig. 3, in substantial alignment across the stoker. Each of the lower tuyère supports 34 has loosely secured to the rearwardly disposed end thereof a nose piece 35. Nose pieces 35 rest upon the upper ends 27 of extension grates 5 and are substantially in transverse alignment with the nose pieces 25 associated with the coal plate extensions 17. The tuyère supports 30 form the side walls of the retorts 3 and form with channel beams 8 the side walls of the tuyère chambers 31 disposed beneath the tuyère blocks 33.

During operation of the pushers 6 the fuel supported upon the tuyère blocks 33 is also moved rearwardly and passes over the nose pieces 35 and onto the extension grates 6 which overfeed it towards the rear of the stoker, as previously described.

Referring more particularly to Figs. 1, 10, 11 and 12, each coal plate extension 17 comprises a rectangular body portion 37, having a relatively thin top wall 38 and side walls 39 and 40 and a relatively thick rear wall 41. The side walls 39 and 40 are recessed, as shown at 43 and 44, to provide a space between the body portion proper and the tuyère supports 34 disposed adjacent thereto. These spaces are provided to enable asbestos rope or other packing material to be inserted between the side walls 39 and 40 of the coal plate extensions 17 and the adjacent tuyère supports 34 to seal the joint therebetween against air leakage into the retorts 3.

As shown more particularly in Fig. 11, a pair of substantially rectangular lugs 45, 45 extend inwardly from side walls 39 and 40 of coal plate extension 17. These lugs also extend from top wall 38 to substantially the lower edges of side walls 39 and 40, and each has extending therethrough an opening 46 for receiving a bolt 20.

The openings 46 provided in the coal plate extensions 17, when the latter are assembled on the stoker, align with openings 47 provided in the upper walls 18 of the associated brackets 13. The bolts 20 extend through the openings 46 and 47 and when tightened effectively secure the coal plate extensions 17 in position. The upper ends 48 of openings 46 are somewhat enlarged and are rectangular in shape and engage the correspondingly shaped heads of the bolts 20, thereby preventing rotation of the latter when the nuts 21 are tightened. During operation of the stoker the upper portions 48 of openings 46 become filled with ashes and thereby not only render the upper surfaces 24 of the coal plate extensions 17 relatively smooth, but protect the bolts 20 against the heat of the furnace and also from chemical reactions which occur in the furnace. The bolts 20, accordingly, may be readily removed when replacements of the coal plate extension 17 are to be made.

The rearwardly disposed wall 41 of body portion 37 terminates at the outer end thereof in a concave bearing portion 49, which in assembly receives the convex forwardly disposed bearing 50 of a nose piece 25. Rear wall 41 has provided therein a pair of spaced slots 53, 53 for receiving the correspondingly spaced tongues 54, 54 of an associated nose piece 25. Bolt receiving openings 55, 55 extend vertically through wall 41, centrally of slots 53, 53. The tongues, 54, 54 are provided with elongated apertures 56, 56 which, in assembly, are adapted to align with openings 55, 55. Accordingly, to assemble a nose piece 25 on a coal plate extension 17, the tongues 54, 54 thereof are inserted in slots 53, 53. Bolts or rivets 57 are then inserted through openings 55, 55 and apertures 56, 56, as shown in Fig. 1. Sufficient clearance is provided between tongues 54, 54 and the upper and lower walls of slots 53, 53 to permit vertical movement of nose pieces 25 upon operation of extension grates 5. The elongated apertures 56, 56 in tongues 54, 54 also permit rocking movement of nose pieces 25.

The upper ends of openings 55, 55 terminate in enlarged rectangular recesses 58, 58, having upwardly converging walls 59, 59. Recesses 58, 58, when bolts 57 have been inserted, are filled with an asbestos cement 60 to protect the said bolts or rivets and to facilitate replacement of the parts. The nose pieces 25 are thus effectively held in position.

The lower edges of side walls 39 and 40 of each coal plate extension 17 have depending slightly therefrom spaced bearing portions 63 which, in assembly, rest upon the upper wall 18 of a supporting bracket 13, thereby reducing the area of contact between the latter and the said coal plate extension. A strengthening rib 64 also extends transversely of the forwardly disposed lugs 45, as shown more particularly in Figs. 11 and 12. Slots 65, 65 extend inwardly from the side walls 39 and 40 of each coal plate extension 17 and connect slots 53, 53 with the exterior of the said side walls 39 and 40.

Each nose piece 25 comprises a substantially rectangular body portion 68, having a relatively thin downwardly and rearwardly inclined portion 69 and a forwardly disposed relatively thick irregular shaped portion 70. The inclined upper surface 73 of portion 69 terminates in the relatively flat upper surface 74 of portion 70. The front end 50 of portion 70 is of convex construction and the spaced tongues 54, 54 extend forwardly thereof, as previously described. The lower surface 75 of portion 70 is flat and is substantially parallel with the upper surface 74 thereof. The lower surfaces 76 of tongues 54, 54 are substantially flush with the lower surface 75 of portion 70, as shown in Figs. 15. A pair of laterally spaced longitudinally extending ribs 77 and 78 are provided at the under side of body portion 68. The lower edges of ribs 77 and 78 extend upwardly and forwardly from a point 79 above the lowermost end 80 of nose piece 25 and terminate in the lower surface 75 of portion 70. The rearmost end of body portion 68 is tapered, as shown at 83, and in assembly rests upon the upper end 27 of extension grates 5.

The upper surface 74 of the front portion 70 of each nose piece 25 has provided therein an elongated transverse groove 84. The upper surface 73 of inclined portion 69 has also provided therein a pair of similarly extended longitudinally spaced transverse grooves 85 and 86. During operation of the stoker, the grooves 84, 85 and 86 become filled with ashes and thereby shield the nose piece 25 to a large extent from the heat of the furnace.

Inclined portion 69 has extending therethrough three rows of spaced apertures 87, 88 and 89 for draft air. These apertures are larger at the bottom and become progressively smaller at the top, thereby producing a nozzle effect causing air to discharge therefrom at relatively high velocities. This tends to increase the burning rate and results in efficient combustion of the fuel as it passes over the nose pieces 25.

Figure 2:
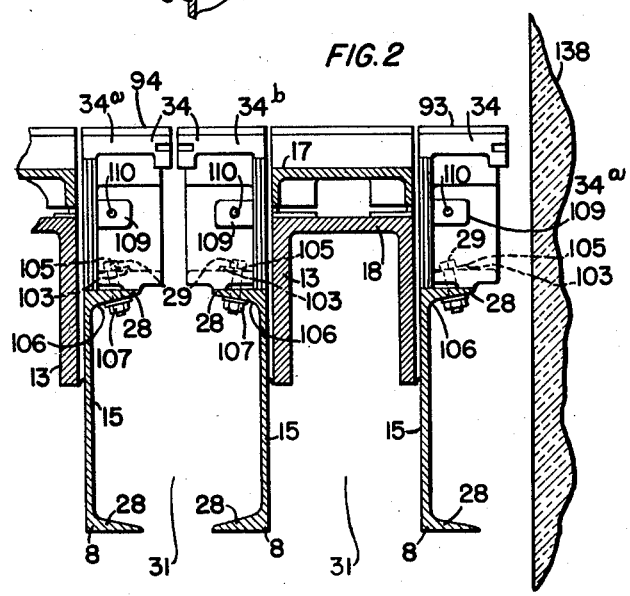
Fig. 2 is a sectional view taken substantially along line 2—2 of Fig. 1.

As shown more particularly in Figs. 2 and 3, one lower tuyère support 34 and associated nose piece 35 is provided for the end tuyère row 93 while two lower tuyère supports 34 and associated nose pieces are provided for the center tuyère rows 94. The tuyère supports 34 are of substantially the same general construction and differ only to the extent that the ones indicated at 34ª are constructed for mounting on the channel beams 8 whose flanges 28 extend to the right (Fig. 2) while those indicated at 34ᵇ are constructed for mounting on the channel beams 8 whose flanges 28 extend to the left. Accordingly, a detailed description of one tuyère support 34 will suffice for all.

Referring more particularly to Figs. 2, 4, 5 and 6, each lower tuyère support 34 is of boxlike construction and comprises top and bottom walls 96 and 97, respectively, inner and outer side walls 98 and 99, respectively, and front and rear walls 100 and 101. Bottom wall 97 has formed thereon a pair of spaced tapered apertured bosses 103, 103, the apertures therein aligning with apertures provided in the upper flange 28 of the associated channel beam 8, when the tuyère support 34 is assembled on the stoker. Bolts 29, 29, extending through the apertures in bosses 103, 103 and in upper flange 28, rigidly retain the tuyère support 34 in position on said channel beam 8. By tapering the bosses 103, 103, as just described, the upper surfaces 105, 105 thereof are substantially parallel with the lower surface 106 of flange 28 and consequently full bearing surfaces are provided for the heads of bolts 29, 29 and the nuts 107, 107 screwed thereon, when the latter are tightened.

Front wall 100 extends across the width of bottom wall 97 but terminates short of the upper edges of side walls 98 and 99 and has provided on the outer side 108 thereof a boss 109, having an aperture 110 extending therethrough. Boss 109 and aperture 110, in assembly, align with a similar boss and aperture (not shown) provided in the next upper tuyère support 30 of the series. A sealing plate 113 is provided between tuyère supports 34 and 30 which, as shown in Fig. 1, extends downwardly between the channel beams 8 and is secured at its lower end to an angle beam 114. A bolt 115 extending through the apertures in bosses 109 secures plate 113 to the abutting ends of tuyère supports 34 and 30.

Figure 5:
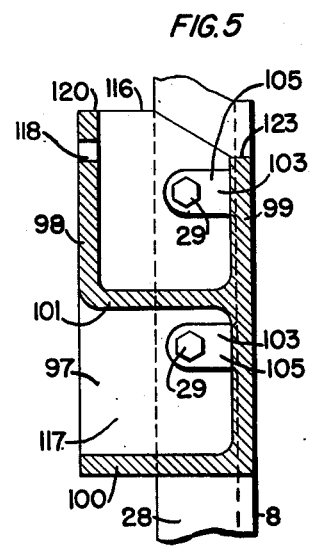
Fig. 5 is a sectional view taken substantially along line 5—5 of Fig. 4.

Rear wall 101 extends between side walls 98 and 99 and between top and bottom walls 96 and 97 as shown more particularly in Figs. 4 and 5 and forms a transverse support for the forward end of top wall 96. Inner side wall 98 extends from the rear edge 116 of bottom wall 97 to rear wall 100 and between top and bottom walls 96 and 97. Since side wall 98 terminates at the rear wall 101, the chamber 117 between front and rear walls 100 and 101 is open at the inner side thereof and, consequently, draft air may enter the said chamber and flow upwardly therein and discharge into the fuel bed between the tuyère blocks 33 disposed thereabove. Side wall 99 has extending therethrough an aperture 118 through which draft air may enter, which then flows upwardly and discharges into the fuel bed through nose pieces 35.

Figure 6:
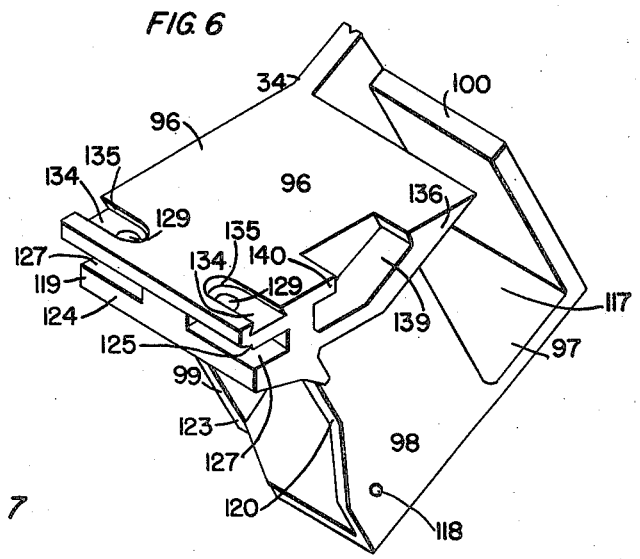
Fig. 6 is a perspective view of a lower tuyère support.
Figure 7:
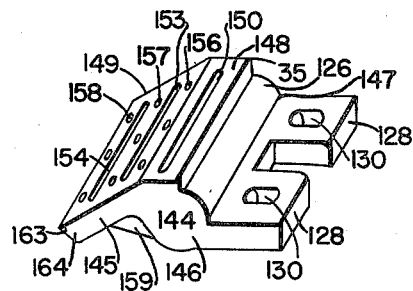
Fig. 7 is a perspective view of the nose piece adapted for attachment to the tuyère support shown in Fig. 6.
Figure 10:
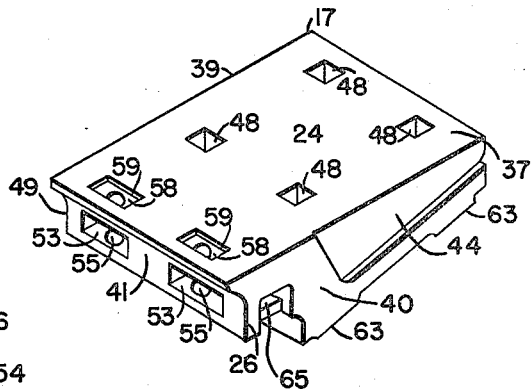
Fig. 10 is a perspective view of a coal plate extension.
Figure 13:
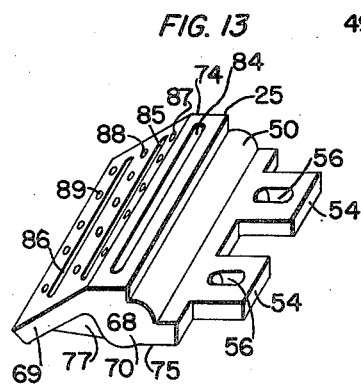
Fig. 13 is a perspective view of the nose piece adapted for attachment to the coal plate extension shown in Fig. 10.

The top wall 96 of lower tuyère support 34 inclines upwardly and rearwardly as shown more particularly in Figs. 4 and 6 and terminates inwardly of front wall 100, thereby providing an opening at the upper end of chamber 117 through which draft air may pass to the overlying tuyère blocks 33. Top wall 96 terminates in a relatively thick rearwardly disposed portion 119 which extends beyond rearwardly disposed edges 120 and 123 respectively of side walls 98 and 99. The rearmost end 124 of top wall 96 is provided with a concave bearing portion 125 which, in assembly, receives the convex front bearing portion 126 of an associated nose piece 35. Portion 119 has provided therein a pair of spaced slots 127, 127 for receiving the correspondingly spaced tongues 128, 128 secured to and extending forwardly of the convex forward end 126 of nose piece 35. A pair of vertical openings 129, 129 extend through portion 119 transversely of slots 127, 127 which, in assembly, align with elongated openings 130, 130 provided in the tongues 128, 128; and bolts or rivets 133, 133 extending through said openings secure the said nose pieces on the tuyère supports 34. The upper ends of openings 129, 129 terminate in enlarged recesses 134, 134 for receiving the heads of the bolts 133, 133 and when the nose pieces 35 have been assembled on tuyère supports 34, the said slots are filled with asbestos cement or other suitable material 131 to protect the said bolts from the heat of the furnace. To retain the said cement in the recesses 134, 134, the walls 135 thereof converge toward the upper ends thereof.

The inner side 136 of top wall 96 extends beyond the inner edge 137 of the bottom wall 97, thereby permitting draft air to flow between the inner side walls 98 of adjacent tuyère supports or between the inner sides of the end tuyère supports and the side wall 138 of the furnace, as the case may be. The inner side 136 of the top wall 96 of one tuyère support 34 lies in substantially abutting relation with the inner side 136 of the top wall 96 of the an adjacent tuyère support or a furnace side wall 138, and since tuyère blocks 33 seat upon the said top walls any air leakage therebetween flows into the furnace between the said tuyère blocks. Since the inner edges 137 of the bottom walls of adjacent tuyère supports are spaced apart, air may freely flow therebetween and into the chambers 117 and thence into the fuel bed through the tuyère block 33 as previously described.

Top wall 96 has provided therein a recess 139 for receiving a hook (not shown) depending from one of the tuyère blocks 33. Recess 139 extends inwardly of side edge 136, intermediate the ends of top wall 96, and is so formed that a hook engaging flange 140 extends over a portion thereof, as shown more particularly in Fig. 6.

The nose pieces 35 are generally similar to the nose pieces 25, previously described, although somewhat narrower in construction. Each nose piece 35 comprises a body portion 144 comprising a downwardly and rearwardly inclined portion 145 and an irregular shaped forward portion 146. The front end 147 of portion 146 has a convex bearing portion 126 provided thereon which, in assembly, seats against the concave bearing portion 125 on a lower tuyère support 34. A pair of spaced tongues 128, 128 having elongated apertures 130, 130 provided therein extend forwardly of the front end 147 of each nose piece 35 and in assembly extend into the slots 127, 127 provided in the associated lower tuyère support 34 as previously described. The upper and lower surfaces 148 and 149 of forward portion 146 are flat and lie in substantially parallel relation, the said upper surface having an extended transverse groove 150 provided therein.

The inclined portion 145 also has a pair of spaced extended transverse grooves 153 and 154 provided in the upper surface 155 thereof. Three rows of spaced upwardly tapering openings 156, 157 and 158 for draft air also extend through the inclined portion 145 of each nose piece 35, which like the rows of openings 87, 88 and 89 provided in nose pieces 25 emit air at relatively high velocities and thereby effect efficient combustion of the fuel in the regions of the fuel bed lying thereabove. A pair of spaced strengthening ribs 159 and 160 depend from the underside of body portion 144. The rearmost end 163 of each nose piece 35 is also beveled, as shown at 164, and in assembly rests upon the upper ends 27 of extension grates 5.

Form the foregoing description it is seen that simplified and highly improved coal plate extensions and lower tuyère supports and removable nose pieces therefor have been provided. Sufficient clearance is provided between the interlocking portions of the coal plate extension and the tuyère supports and their associated nose pieces to permit the latter to rock vertically during operation of the extension grate 5. It is also seen that the tongues provided on the nose pieces extend into slots provided in the associated coal plate extensions and lower tuyère supports which are disposed beneath the upper surfaces thereof and therefore are shielded from the heat of the furnace. The parts are also so constructed that a minimum of time and effort is required to install or to replace them when they become worn or damaged.

While the embodiments herein shown and described are admirably adapted to fulfill the objects primarily stated, it is to be understood that it is not intended to limit the invention thereto, since they may be embodied in other forms, all coming within the scope of the claims which follow.

What is claimed is:

1. In a device of the class described, the combination of a stoker comprising downwardly and rearwardly inclined alternately disposed retorts and tuyère rows, means provided in said retorts for feeding fuel therealong, extension grates provided at one end of said retorts and tuyère rows, means for imparting rocking and reciprocating movements to said extension grates, coal plate extensions mounted in the bottoms of said retorts at the lower ends thereof, a nose piece extending between each coal plate extension and said extension grates, and coacting means on said coal plate extensions and nose pieces so constructed as to permit vertical movement of the latter during operation of said extension grates, said coacting means including means for retaining said nose pieces in position on said coal plate extensions.

2. In a device of the class described, the combination of a stoker comprising downwardly and rearwardly inclined alternately disposed retorts and tuyère rows, means provided in said retorts for feeding fuel therealong, extension grates provided at one end of said retorts and tuyère rows, means for imparting rocking and reciprocating movements to said extension grates, lower tuyère supports provided at the lower ends of said tuyère rows, a nose piece extending between each of said lower tuyère supports and said extension grates, and coacting pivotal means on said lower tuyère supports and nose pieces so constructed as to permit vertical movement of the latter during operation of said extension grates, said coacting pivotal means including means for retaining said nose piece in position on said lower tuyère supports.

3. In a device of the class described, the combination of a stoker comprising downwardly and rearwardly inclined alternately disposed retorts and tuyère rows, means provided in said retorts for feeding fuel therealong, extension grates provided at one end of said retorts and tuyère rows, means for imparting rocking and reciprocating movements to said extension grates, lower tuyère supports provided at the lower ends of said tuyère rows, a nose piece extending between each of said lower tuyère supports and said extension grates, a concave bearing portion formed on each of said tuyère supports having a pair of spaced slots therein and bolt openings extending transversely of said slots, a convex bearing portion on each of said nose pieces adapted to engage said concave portions, spaced apertured tongues extending from said convex portion and adapted to extend into said slots, bolt means adapted to extend through said openings and apertures for securing said nose pieces to said lower tuyère supports, and said tongues and slots having lost motion therebetween to permit vertical movement of said nose pieces upon operation of said extension grates.

4. In a device of the class described, the combination of a stoker comprising downwardly and rearwardly inclined alternately disposed retorts and tuyère rows, means provided in said retorts for feeding fuel therealong, extension grates provided at one end of said retorts and tuyère rows, means for imparting rocking and reciprocating movements to said extension grates, coal plate extensions mounted at the lower ends of said retorts, a nose piece extending between each coal plate extension and said extension grates, a concave bearing portion formed on each of said coal plate extensions having spaced slots provided therein and bolt openings extending transversely of said slots, convex bearing portions provided on each of said nose pieces adapted to engage said concave bearing portions, apertured tongues extending from said nose piece adapted to enter said slots, and bolt means extending through said openings and apertures for securing said nose pieces in position on said coal plate extensions.

5. In a device of the class described, the combination of a stoker comprising downwardly and rearwardly inclined alternately disposed retorts and tuyère rows, means provided in said retorts for feeding fuel therealong, extension grates provided at one end of said retorts and tuyère rows, means for imparting rocking and reciprocating movements to said extension grates, coal plate extensions mounted at the lower ends of said retorts, a nose piece extending between each coal plate extension and said extension grates, a concave bearing portion formed on each of said coal plate extensions having spaced slots provided therein and bolt openings extending transversely of said slots, convex bearing portions provided on each of said nose pieces adapted to engage said concave bearing portions, apertured tongues extending from said nose pieces adapted to enter said slots, bolt means extending through said openings and apertures for securing said nose pieces in position on said coal plate extensions, lower tuyère supports provided at the lower ends of said tuyère rows in substantially transverse alignment with said coal plate extensions, nose pieces in substantially transverse alignment with said first mentioned nose pieces extending between each of said lower tuyère supports and said extension grates, a concave bearing portion formed on each of said tuyère supports having a pair of spaced slots provided therein and bolt openings extending transversely of said slots, a convex portion provided at one end of each of said nose pieces adapted to engage said concave bearing portions, spaced apertured tongues extending from said convex portion adapted to enter said slots, and bolt means extending through said openings and apertures for securing said nose pieces in position on said lower tuyère supports.

6. In a device of the class described, the combination of a coal plate extension, and a nose piece attached to one end of said coal plate extension, said coal plate extension comprising a substantially rectangular body portion, a bearing portion formed on said body portion, a bearing portion formed on said nose piece adapted to engage said first mentioned bearing portion, and coacting pivotal means provided on said coal plate extension and nose piece so constructed as to permit vertical movement of the latter, said coacting pivotal means including means for loosely securing said nose piece in position on said coal plate extension.

7. In a device of the class described, the combination of a coal plate extension, and a nose piece detachably secured thereto, said coal plate extension comprising a substantially rectangular body portion having a top wall, substantially parallel side walls, and an end wall, a substantially concave bearing portion formed on said end wall having spaced slots extending inwardly thereof and bolt openings extending transversely of said slots, a substantially convex bearing portion formed on said nose piece adapted to engage said concave bearing portion, spaced apertured tongues extending from said convex portion and adapted to extend into said slots, and bolt means extending through said openings and apertures for retaining said nose piece in position on said coal plate extension.

8. In a device of the class described, the combination of a coal plate extension, and a nose piece detachably secured thereto, said coal plate extension comprising a substantially rectangular body portion having a top wall, substantially parallel side walls and an end wall, a substantially concave bearing portion formed on said end wall having spaced slots extending inwardly thereof and bolt openings extending transversely of said slots, spaced lugs extending inwardly of said side walls having bolt receiving openings therein for retaining said coal plate extension in position, a substantially convex bearing portion formed on said nose piece adapted to engage said concave bearing portion, spaced apertured tongues extending from said convex portion and adapted to extend into said slots, bolt means extending through said openings and apertures for retaining said nose piece in position on said coal plate extension, and said nose piece having openings therein through which draft air may pass.

9. In a device of the class described, the combination of a lower tuyère support, and a nose piece detachably secured thereto, said lower tuyère support comprising spaced top and bottom walls and spaced side walls, said bottom wall having one or more bolt receiving openings therein for securing said lower tuyère support in position, a bearing portion formed on said top wall, a bearing portion formed on said nose piece adapted to engage said first mentioned bearing portion, and coacting means provided on said lower tuyère support and said nose piece so constructed as to permit vertical movement of the latter, said coacting means including means for securing said nose piece in position on said lower tuyère support.

10. In a device of the class described, the combination of a lower tuyère support, and a nose piece detachably secured to said lower tuyère support, said lower tuyère support comprising spaced top and bottom walls, spaced side walls and spaced front and rear walls, said bottom wall having one or more tapered bosses formed thereon, said bosses having bolt receiving openings therein for securing said lower tuyère support in position, said top wall having a substantially smooth upper surface having a recess formed at one side thereof and a substantially concave bearing portion remote from said front wall, said bearing portion having spaced inwardly extending slots therein and openings extending transversely of said slots, a substantially convex bearing portion formed on said nose piece adapted to engage said concave portion, spaced apertured tongues extending from said convex portion and adapted to extend into said slots, and bolt means extending through said openings and apertures for retaining said nose piece in position.

11. A coal plate extension comprising a substantially rectangular body portion having a top wall, substantially parallel side walls and an end wall, spaced enlarged lugs extending inwardly from said side walls having bolt receiving recesses extending therethrough, and a substantially arcuate bearing portion formed on said end wall having one or more spaced slots extending inwardly of the latter.

12. A coal plate extension comprising a substantially rectangular body portion having a top wall, substantially parallel side walls and an end wall, a substantially concave bearing portion provided on said end wall having spaced substantially horizontal slots provided therein and substantially vertical bolt receiving openings extending transversely of said slots, said openings terminating at the upper ends thereof in enlarged recesses for receiving protective materials, and said recesses having upwardly converging walls for retaining said materials in position.

13. A coal plate extension comprising a substantially rectangular body portion having a top wall, substantially parallel side walls and an end wall, spaced enlarged lugs extending inwardly of said side walls having substantially vertical bolt receiving openings extending therethrough, the upper portions of said openings being enlarged and rectangular in shape for receiving the heads of the bolts, a substantially concave bearing portion provided on said end wall having spaced substantially horizontal slots provided therein and substantially vertical bolt receiving openings extending transversely of said slots, said openings terminating at the upper ends thereof in enlarged recesses for receiving protective materials, said recesses having upwardly converging walls for retaining said materials in position, and a transverse rib depending from said top wall and extending between certain of said enlarged lugs.

14. A coal plate extension comprising a substantially rectangular body portion having a relatively smooth top wall, substantially parallel side walls and an end wall, said side walls having extended recesses provided therein for receiving packing material, spaced enlarged lugs depending from said top wall and extending inwardly of said side walls, each of said lugs having a vertically disposed bolt receiving opening extending therethrough, an arcuate bearing portion on said end wall, and said arcuate bearing portion having one or more spaced slots extending inwardly thereof.

15. A nose piece for attachment to the fixed structure of stoker grates for bridging the space between said fixed structure and a movable extension grate, said nose piece comprising in plan a substantially rectangular body portion having a relatively thin downwardly inclined rear portion engageable with said extension grate and a relatively thick front portion, an arcuate bearing portion on said forwardly disposed portion for sliding engagement with said structure, spaced apertured attachment tongues extending forwardly from said arcuate portion for retaining said nose piece in position, said front and rear portions having extended transverse grooves provided therein, and said inclined portion having series of spaced openings provided therein through which draft air may pass.

16. A nose piece comprising a substantially rectangular body portion having a relatively thin downwardly inclined rear portion and a relatively thick irregular shaped front portion, said front portion having substantially parallel top and bottom surfaces, said top surface having an extended transverse groove provided therein, said inclined portion having series of upwardly tapering openings extending therethrough for draft air and transverse grooves extending between said series of openings, a convex bearing portion on said forward portion, and spaced apertured tongues extending from said convex portion.

17. A lower tuyère support comprising a substantially boxlike body portion having spaced top and bottom walls, spaced side walls and spaced front and rear walls, said rear wall extending between said top and bottom walls and between said side walls, one of said side walls and the top wall terminating short of said front wall thereby providing openings therebetween, and a substantially arcuate bearing portion formed at the rear end of said top wall having one or more spaced slots extending rearwardly therein.

18. A lower tuyère support comprising a substantially boxlike body portion having spaced top and bottom walls, spaced side walls and spaced front and rear walls, said rear wall extending between said top and bottom walls and between said side walls, one of said side walls and the top wall terminating short of said front wall thereby providing openings therebetween, a substantially arcuate bearing portion formed at the rear end of said top wall having one or more spaced slots extending rearwardly therein, one side edge of said top wall projecting beyond one of said side walls, and having a recess in the upper surface thereof, said recess being in part undercut to afford a flange extending over a portion of said recess.

19. A lower tuyère support comprising a substantially boxlike body portion having spaced top and bottom walls, spaced side walls and spaced front and rear walls, said rear wall extending between said top and bottom walls and between said side walls, one of said side walls and the top wall terminating short of said front wall thereby providing openings therebetween, a substantially arcuate bearing portion formed at the rear end of said top wall having one or more spaced slots extending rearwardly therein, one side edge of said top wall projecting beyond one of said side walls, and having a recess in the upper surface thereof, said recess being in part undercut to afford a flange extending over a portion of said recess, and one or more tapered bosses provided on said bottom wall, each of said bosses having a bolt receiving opening extending therethrough for securing said tuyère support in position.

20. A lower tuyère support of generally rectangular form comprising top, bottom and side wall portions, said bottom wall having one or more openings for reception of anchor bolts, and said top wall terminating at its rearward end in a portion of relatively great thickness having a bearing surface remote from the upper surface of said top wall, and means in said end portion for attaching a relatively movable nose piece to said support for engagement with said bearing surface.

21. A lower tuyère support according to claim 20 wherein the said attaching means for the nose piece comprises one or more slots extending inwardly from the rear end of said rearward end portion from points below the upper surface of said top wall.

22. A lower tuyère support according to claim 21 wherein apertures are provided in both the top and bottom walls of each of the slots, said top wall aperture being aligned with the bottom wall aperture for reception of slot-intersecting bolts.

23. A lower tuyère support according to claim 20 wherein the top wall of the support is provided at one side with a recess, said recess being undercut at the rearward end thereof to afford a tuyère-hook-engaging flange overlying a portion of said recess.

JUNE E. BECK.

REFERENCES CITED

The following references are of record in the file of this patent:

UNITED STATES PATENTS

| Number | Name | Date |
|---|---|---|
| 1,380,844 | Schmidt | June 7, 1921 |
| 1,443,202 | Alpern | Jan. 23, 1923 |
| 1,452,314 | Ruggles | Apr. 17, 1923 |
| 1,633,418 | Priebe et al. | June 21, 1927 |
| 1,798,019 | Harrison | Mar. 24, 1931 |
| 2,081,067 | Preston | May 18, 1937 |
| 2,282,157 | Bennett | May 5, 1942 |

FOREIGN PATENTS

| Number | Country | Date |
|---|---|---|
| 316,120 | Great Britain | July 23, 1929 |
| 306,535 | Italy | Mar. 24, 1933 |